United States Patent
Green et al.

(10) Patent No.: US 6,204,573 B1
(45) Date of Patent: Mar. 20, 2001

(54) METHOD AND CIRCUIT FOR MAINTAINING CHARGE IN A BACKUP BATTERY

(75) Inventors: Lawrence M. Green, Lindenhurst; Richard L. Hammon, Hanover Park, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/177,878

(22) Filed: Jan. 5, 1994

(51) Int. Cl.$^7$ ....................................... H02J 7/00
(52) U.S. Cl. ................................ 307/66; 307/64; 307/85
(58) Field of Search ................................ 307/64, 66, 85, 307/86, 87; 365/228, 229, 225, 226, 227

(56) References Cited

U.S. PATENT DOCUMENTS

| | | | |
|---|---|---|---|
| 4,382,221 | * 5/1983 | Reynolds | 320/35 |
| 4,528,459 | 7/1985 | Wiegel | 307/66 |
| 4,672,293 | * 6/1987 | Crampton | 307/66 |
| 4,673,826 | * 6/1987 | Masson | 307/66 |
| 4,730,121 | 3/1988 | Lee et al. | 307/66 |
| 4,745,299 | * 5/1988 | Eng et al. | 307/66 |
| 5,057,697 | 10/1991 | Hammond et al. | 307/66 |
| 5,058,075 | * 10/1991 | Mizuta | 365/229 |
| 5,204,610 | 4/1993 | Pierson et al. | 320/15 |
| 5,204,963 | 4/1993 | Noya et al. | 395/750 |
| 5,247,205 | * 9/1993 | Mototani et al. | 307/66 |
| 5,251,179 | * 10/1993 | Wittman | 365/229 |
| 5,309,031 | * 5/1994 | Stewart et al. | 307/66 |

\* cited by examiner

*Primary Examiner*—Albert W. Paladini
(74) *Attorney, Agent, or Firm*—John J. King; Daniel Collopy

(57) ABSTRACT

A method eliminates the discharge of the backup battery (42) prior to the primary source of power initially being applied to the device. The method comprises detecting the application of a source of primary power (12) and providing a path by way of a switch (46) in response to receiving the power (14), wherein the path allows the backup battery to power the device. Also, a circuit for maintaining the charge in a backup battery (42) of a device before primary power is applied comprises a sensing circuit (60) for generating an activation signal after initially sensing the application of the primary power to the device, and a switch element (61) coupled the sensing circuit (60) to receive the activation signal. The switch element (61) provides a path for the backup battery (42) to power the device. Accordingly, the method and circuit allow manufacturers of devices incorporating a backup battery (42) to install the backup battery (42) prior to shipping and eliminate the requirement for the purchaser of the device to install the backup battery (42).

17 Claims, 3 Drawing Sheets

METHOD AND CIRCUIT FOR MAINTAINING CHARGE IN A BACKUP BATTERY

FIELD OF THE INVENTION

The present invention is generally related to backup batteries, and more particularly to a method and circuit for maintaining the charge in a backup battery installed in a device.

BACKGROUND OF THE INVENTION

Many devices such as electric alarm clocks or cordless telephones incorporate a backup battery to provide power to the device. Because the backup battery provides power when the primary source of power is interrupted, the backup battery would become discharged if it were installed prior to shipping. Presently, such a device is shipped to a purchaser without a backup battery installed, if a battery is included with the device. The installation of a backup battery is considered an inconvenience for the purchaser of the device. In particular, tools and some time may be required to install the backup battery, depending on where the battery is located in the device.

Generally, circuits have been developed to provide backup battery power after the loss of primary power. For example, U.S. Pat. No. 5,057,697 to Hammond et al. discloses an uninterruptible power supply that incorporates switching circuitry permitting a path for DC backup power to be supplied to a voltage-declining primary power supply. A first switch SW1 couples primary power to a load. A second switch SW2 couples a back-up battery to a power transition switch circuit 114 comprising a bank of zener diodes coupled in series with a pair of parallel transistors 124 which are supplied with a separate 12V DC voltage source. At a point where the backup battery no longer provides useful power, disabling circuitry disconnects the battery from the load.

Further, circuits have been developed which will close a first switch in response to detecting the application of power, followed by closing a second switch in response to detecting the loss of power. Both switches will be opened after a predetermined period of time to conserve battery power. Referring particularly to U.S. Pat. No. 4,528,459 to Wiegel, whenever the supply of primary power is detected, a first switch 18 is closed. Closing relay contact 18 couples the backup power source 16 to the series circuit comprising contact 18 and electronic switch 22, but does not connect power from the backup source to the load 12 until the second switch, electronic switch 22, is enabled. Electronic switch 22 is enabled upon decay or turn-off of primary voltage.

Accordingly, there is a need for a simple method and circuit to prevent the discharge of a backup battery which is installed prior to an initial application of primary power.

BRIEF DESCRIPTION OF THE DRAWINGS

In describing the method and circuit for maintaining charge in a backup battery, reference is made to the following drawings wherein.

DESCRIPTION OF THE PREFERRED EMBODIMENTS

In a device incorporating a backup battery for supplying power to the device in the event the primary supply of power is interrupted, a method and circuit eliminate the discharge of the backup battery prior to the primary source of power initially being applied to the device. In particular, the method includes the steps of initially providing a primary source of power to the device; coupling the primary source of power to a switch of the device to close the switch; and providing a path by way of the switch in response to receiving the primary source of power, wherein the path allows the backup battery to power the device.

Also, a circuit for maintaining the charge in a backup battery of a device includes a switch circuit comprising a sensing circuit for generating an activation signal after initially sensing the application of the primary power to the device, and a switch element coupled to the sensing circuit to receive the activation signal. The switch element provides a path for the backup battery to power the device after primary power is applied to the device.

The method and circuit prevents discharge of the backup battery during shipping and eliminate the requirement for the purchaser of the device to install the backup battery. Accordingly, the method and circuit allow manufacturers of devices incorporating a backup battery to install the backup battery prior to shipping.

Figure 1:
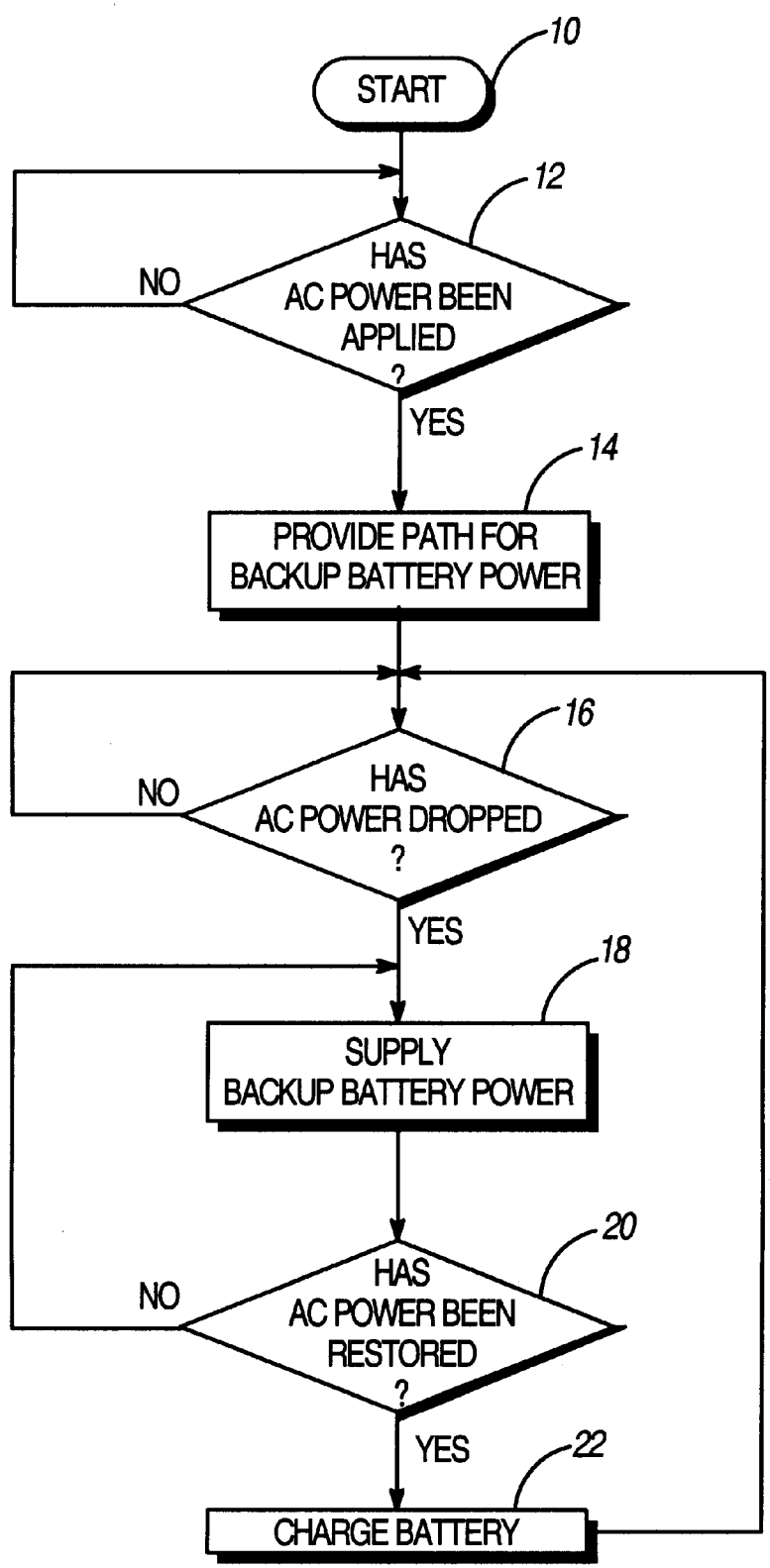
FIG. 1 is a flow chart of the method for maintaining charge in a backup battery according to the present invention.

Turning to FIG. 1, a flow chart for the method for maintaining charge in a backup battery is shown. Initially at step 10, a battery is operably connected in any device adapted to be powered by a backup battery during primary power loss, such as an interruption in AC power. The battery is initially decoupled from the load by a switch circuit to prevent discharge of the backup battery, for example, during shipping or after a reset condition. The switch circuit generally provides an open circuit in the path from the battery to the load to prevent the discharge of the battery before AC power is applied. The switch circuit could be any device which could provide a path from the battery to the load after the initial detection of power from an AC power transformer to power the device. Accordingly, the switch circuit monitors whether AC power has been initially applied to the device at a step 12.

As soon as AC power is detected, the switch circuit provides a path to couple the backup battery to the load at a step 14. Unlike a conventional device having a backup battery, a path coupling the backup battery to the load is only provided after AC power is initially applied to the device, preventing the undesired discharge of the installed backup battery during shipping. The path is continuously maintained after AC power is initially detected in order to allow the backup battery to power the device after the primary source of power is interrupted.

The device then monitors whether the AC power has dropped at a step 16. If the AC power has dropped, backup battery power is supplied at a step 18 by way of the path established by the switch circuit. The device continues to monitor whether AC power has been restored at a step 20, and continues to supply backup battery power until AC power is restored. Once AC power has been restored, the device can charge the battery at a step 22 and continue to monitor the AC power supply at a step 16.

Figure 2:
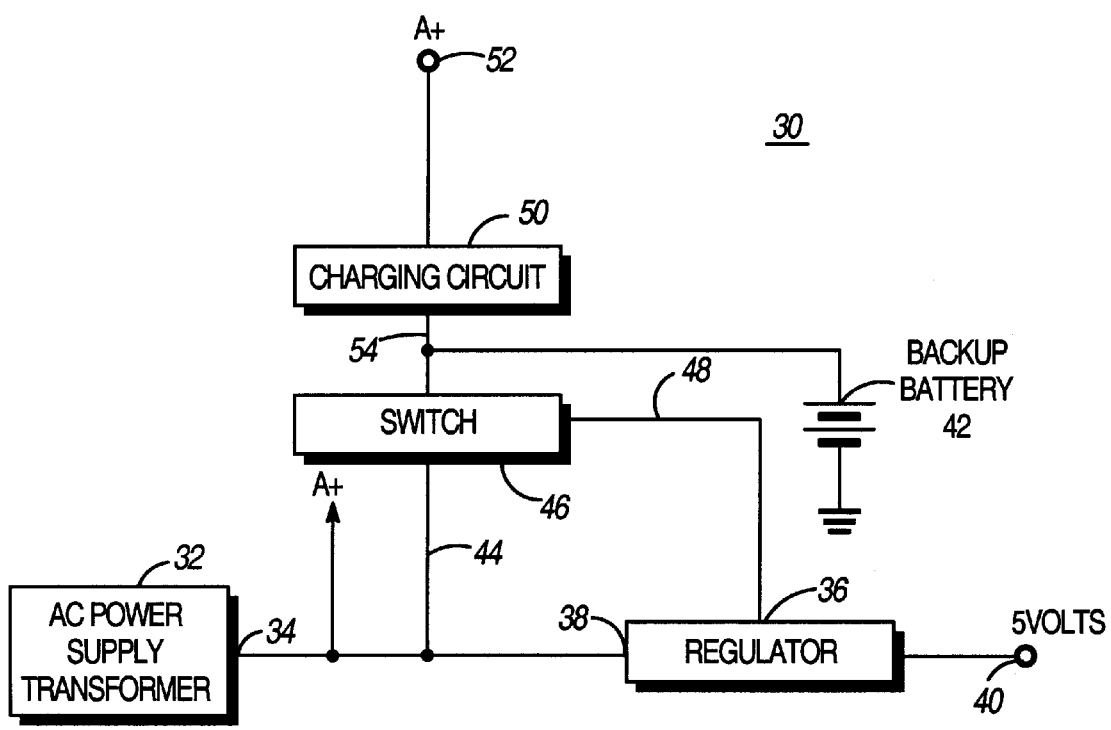
FIG. 2 is a block diagram of a circuit for maintaining charge in a backup battery according to the present invention.

Turning now to FIG. 2, a block diagram of a circuit for maintaining charge in a backup battery according to the present invention is shown. The circuit generally includes an AC power supply transformer 32 for generating an output voltage A⁺ at an output 34. The circuit also includes a voltage regulator 36 having an input 38 which is coupled to receive the output voltage A⁺ of the transformer. Regulator 36 generates a fixed output voltage or reference voltage at an output 40. For example, a 5 volt output could be generated for powering the device. The circuit also includes a backup battery 42. The backup battery is preferably a rechargeable battery, such as a NiC (nicad) battery. Backup battery 42 is coupled to regulator 38 by way of a switch circuit 46. Switch circuit 46 could include any device which provides a path from backup battery 42 to regulator 36 after initially detecting power on line 48 from regulator 36. A charging circuit 50 is coupled to the backup battery 42 to maintain the charge in the backup battery after the switch is opened upon initial detection of AC power. Charging circuit 50 is coupled to the A⁺ voltage at an input 52 to provide power to recharge backup battery 42 at node 54.

Figure 3:
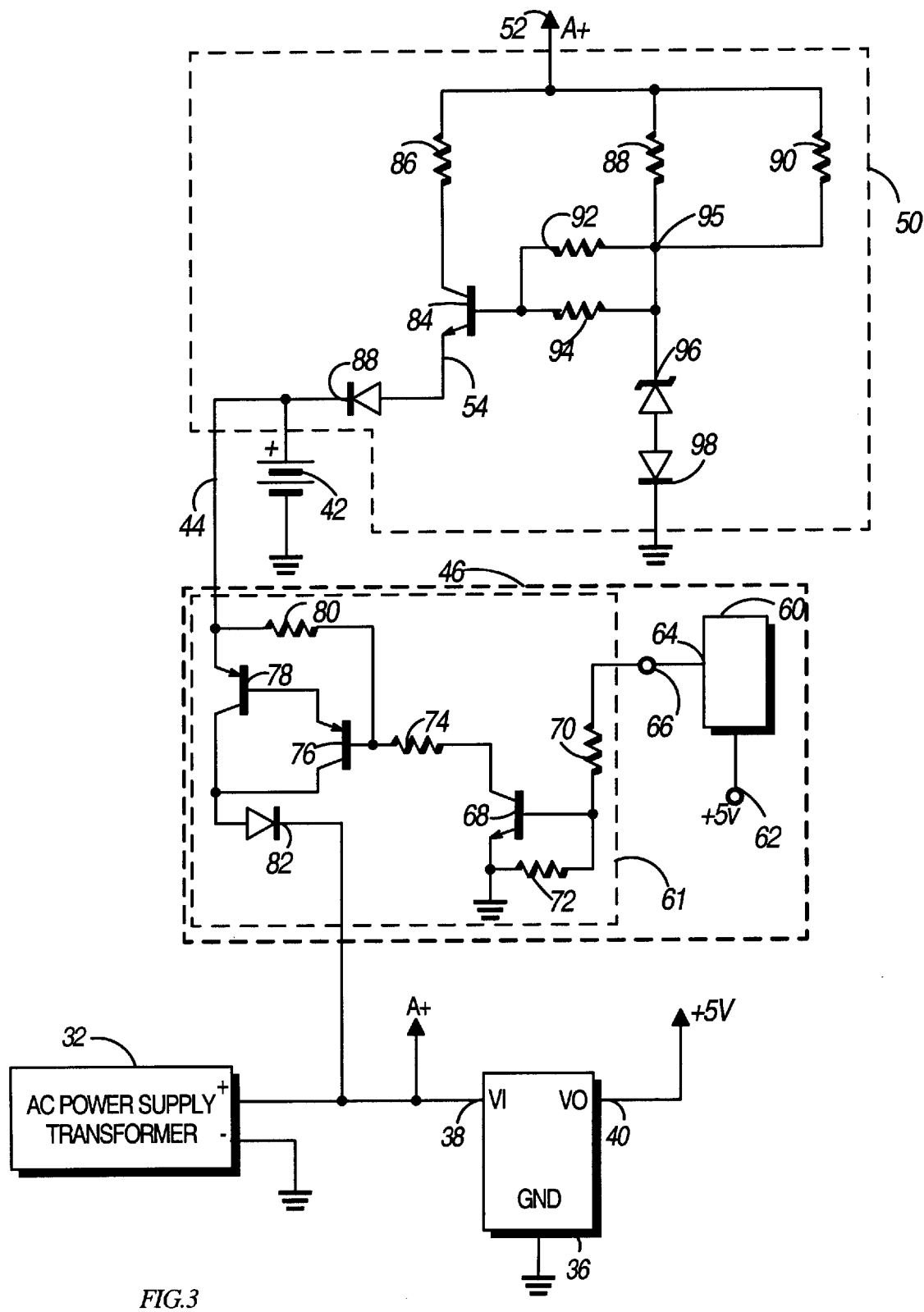
FIG. 3 is a detailed schematic of the circuit for maintaining charge in a backup battery shown in block form in FIG. 2.

Turning now to FIG. 3, a detailed schematic of the preferred circuit for maintaining charge in a backup battery (shown in block form in FIG. 2) is described. Preferably, switch circuit 46 includes an AC sensing circuit 60 which can detect the initial application of AC power to the device and a switch element 61 to provide a discharge path for battery 42. AC sensing circuit 60 could be a simple latch circuit. Alternatively, AC sensing circuit could be a microprocessor which has some other application in the device. AC sensing circuit 60 receives the 5V output of regulator 36 at an input 62. AC sensing circuit 60 generates an output signal at an output 64. Output 64 is coupled to a node 66 of switch circuit 46.

Switch element 61 generally provides a path from battery 42 to voltage regulator 36 and could include a single transistor having a control electrode coupled to receive the output signal at node 66. Alternatively, a more detailed transistor network could be employed to provide a path from backup battery 42 to regulator 36. For example, bipolar transistors having a control electrode (base) and a path of controllable conductivity between a first electrode (collector) and a second electrode (emitter) could be employed. Particularly, as shown in FIG. 3, node 66 is coupled to the base of an NPN transistor 68 by an input resistor 70. Preferably, input resistor 70 is a 10 KΩ resistor. A resistor 72 is also coupled between the base of transistor 68 and the emitter of transistor 68, which is coupled to ground. Preferably, resistor 72 is a 33 KΩ resistor. The collector of transistor 68 is coupled by a resistor 74 to Darlington pair of PNP transistors 76 and 78. Preferably, resistor 74 is a 1 KΩ resistor. The base of transistor 76 is coupled to the emitter of transistor 78 and backup battery 42 by way of resistor 80. Preferably, resistor 80 is a 33 KΩ resistor. Also, the emitter of transistor 76 is coupled to the base of transistor 78. Finally, the collectors of transistors 76 and 78 are coupled together, and are coupled to voltage regulator 36 by way of a diode 82. Diode 82 generally prevents leakage current passing to switch circuit 46 from the AC power supply transformer.

In maintaining the charge on the battery before AC power is supplied, switch circuit 46 generally prevents the discharge of battery 42 by way of path 44 through the Darlington pair of transistors 76 and 78 and diode 82. In particular, the AC sensing circuit generates a low signal at output 64 until the application of an AC power signal to the device is initially detected at input 62. With a low signal at output 64, the voltage on the base of transistor 68 is low, maintaining transistor 68 in cutoff. Accordingly, the transistors 76 and 78 will also be in cutoff, preventing the discharge of battery 42 by way of path 44.

When the application of an AC signal to the device is detected by AC sensing circuit 60, a high output is generated at output 64, thereby turning on transistors 68, 76 and 78 to provide a path between backup battery 42 to the voltage regulator 36. Accordingly, after power has initially been applied, the backup battery is continuously coupled to the load to provide backup power when the supply of AC power is thereafter interrupted. That is, after an AC power supply signal is initially detected, the AC sensing circuit 60 will continuously generate an output to provide a path for backup battery 42 to supply power to voltage regulator 36.

A charging circuit 50 is also be incorporated in the circuit of the present invention to maintain the charge on the battery after power is initially applied and the switch is open. The preferred charging circuit 50 includes an NPN transistor 84 which generally couples the voltage A⁺ to the battery. In particular, the collector of transistor 84 is coupled by a resistor 86 to voltage A⁺ at input 52. Preferably, resistor 86 is a 200Ω resistor. The emitter of transistor 84 is coupled to battery 42 by a diode 88. Diode 88 is included to prevent reverse biasing of transistor 84. Finally, the base of transistor 84 is coupled to input 52 by parallel resistors 88 and 90 and parallel resistors 92 and 94. The parallel resistors are coupled in series between A⁺ and the base of transistor 84 at a node 95. Resistors 88–94 are preferably 330Ω resistor. Finally, a series configuration of diodes 96 and 98 is coupled to node 95 to set the termination voltage of the charge circuit. In particular, diodes 96 and 98 will turn off transistor 84 when the battery voltage exceeds the maximum desired battery voltage. Accordingly, protection is provided if the user inadvertently uses alkaline batteries with the charging circuit.

It will be understood that other circuits for providing a path from the battery to the voltage regulator or circuits for charging the battery could be employed within the spirit and scope of the present invention. The detailed circuits described above are representative circuits which could be employed. Also, AC power is described above as the primary source of power by way of example. The method and circuit of the present invention could be incorporated in a device having some other source of primary power. For example, the primary source of power could be solar power.

In summary, the method and the circuit of the present invention allows a backup battery to be installed in a device prior to shipping without having the battery become discharged during shipping. The method and circuit can provide a convenience for the purchaser of any device which employs a battery as a backup power source to a primary power source.

What is claimed is:

1. A method for maintaining the charge in a backup battery of a device adapted to receive a source of primary power, the method comprising the steps of:

initially providing the source of primary power to the device;

coupling the source of primary power to a switch of the device to close the switch;

providing and maintaining a path by way of the switch in response to initially receiving the source of primary power, the path allowing the backup battery to power the device when the source of primary power is removed after being initially provided; and maintaining the charge on the backup battery by coupling the source of primary power to the backup battery.

2. The method for maintaining the charge in a backup battery according to claim 1 wherein said step of coupling the source of primary power to a switch comprises transforming the primary power to generate a DC reference voltage which is coupled to the switch.

3. The method for maintaining the charge in a backup battery according to claim 1 wherein said step of providing a path comprises turning on at least one transistor.

4. The method for maintaining the charge in a backup battery according to claim 1 wherein said step of coupling a source of primary power to a switch comprises providing AC power.

5. A method for maintaining the charge in a backup battery of a device before AC power is applied to the device, the method comprising the steps of:
   providing an open circuit in a path coupling the backup battery to a load in the device;
   initially providing a supply of AC power to the device;
   transforming the AC power to generate a DC reference voltage;
   coupling the DC reference voltage to a microprocessor;
   providing a signal from the microprocessor to the switch to provide and maintain a closed circuit in the path to enable the backup battery to power the load upon initially providing a supply of AC power to the device and when said supply of AC power is removed; and
   maintaining the charge on the backup battery with the supply of AC power.

6. A circuit for maintaining the charge in a backup battery of a device before AC power is applied comprising:
   an AC sensing circuit for generating an activation signal after initially sensing the application of the AC power to said device;
   a switch coupled to said AC sensing circuit to receive said activation signal, said switch providing and maintaining a path for said backup battery to power said device when said AC power is removed after the initial application of said AC power to the device; and
   a charging circuit for maintaining the charge on said backup battery.

7. The circuit for maintaining the charge in a backup battery according to claim 6 wherein said AC sensing circuit comprises a microprocessor.

8. The circuit for maintaining the charge in a backup battery according to claim 7 further comprising an AC power transformer receiving a source of AC power and coupled to said microprocessor, said AC power transformer generating a DC supply voltage.

9. The circuit for maintaining the charge in a backup battery according to claim 6 to further comprising a regulator circuit coupled to said AC power supply circuit for generating a regulated DC voltage supply.

10. The circuit for maintaining the charge in a backup battery according to claim 6 wherein said switch comprises at least one transistor.

11. The circuit for maintaining the charge in a backup battery according to claim 6 wherein said switch comprises a first transistor having a path of controllable conductivity and a control terminal coupled to receive said activation signal, and a pair of transistors configured in a Darlington configuration, said pair of transistors coupled to said path of controllable conductivity and providing a path for said backup battery to power said device.

12. The circuit for maintaining the charge in a backup battery according to claim 6 wherein said charging circuit comprises a transistor having a path of controllable conductivity for providing current to charge said backup battery.

13. A circuit for maintaining the charge in a backup battery of a device comprising:
   an AC power supply transformer for receiving a source of AC power and generating a DC supply voltage;
   a microprocessor coupled to said AC power supply transformer, said microprocessor generating an activation signal in response to initially receiving said DC supply voltage;
   a switch circuit responsive to said activation signal from said microprocessor, said switch circuit providing and maintaining a path from said backup battery to a load of said circuit after AC power is initially applied to said AC power supply transformer and when said source of AC power is removed;
   a regulator circuit coupled to said AC power supply transformer and said backup battery by way of said switch circuit for generating a regulated output voltage; and
   a charging circuit coupled to receive said DC supply voltage, said charging circuit for maintaining the charge on said battery when said AC power is initially applied.

14. A method for maintaining the charge in a backup battery of a device adapted to receive a source of primary power, the method comprising the steps of:
   initially providing the source of primary power to the device;
   coupling the source of primary power to a switch of the device to close the switch;
   providing and maintaining a path by way of the switch in response to receiving the primary power, the path allowing the backup battery to power the device when said source of primary power is removed; and
   coupling the source primary power to the backup battery to maintain the charge on the backup battery; and
   decoupling the backup battery when the charge on the backup battery exceeds a predetermined voltage.

15. A circuit for maintaining the charge in a backup battery of a device before AC power is applied comprising:
   an AC sensing circuit for generating an activation signal after initially sensing the application of the AC power to said device after a reset condition occurs;
   a switch coupled to said AC sensing circuit to receive said activation signal, said switch providing and maintaining a path for said backup battery to power said device when said AC power is removed after the application of the AC power; and
   a charging circuit for coupling charging current to said backup battery until said backup battery reaches a predetermined voltage.

16. The circuit for maintaining the charge in a backup battery according to claim 15 wherein said charging circuit comprises a zener diode coupled to the base of a transistor having a path of controllable conductivity adapted to provide charging current to said backup battery until said backup battery exceeds the voltage of said zener diode less the difference between the base voltage and the emitter voltage of said transistor.

17. A circuit for maintaining the charge in a backup battery of a device comprising:
   an AC power supply transformer for receiving a source of AC power and generating a DC supply voltage;

a microprocessor coupled to said AC power supply transformer, said microprocessor generating an activation signal in response to initially receiving said DC supply voltage;

a switch circuit responsive to said activation signal from said microprocessor, said switch circuit providing and maintaining a path from said backup battery to a load of said circuit after AC power is initially applied to said AC power supply transformer and when said source of AC power is removed;

a regulator circuit coupled to said AC power supply transformer and said backup battery by way of said switch circuit for generating a regulated output voltage; and a charging circuit coupled to receive said regulated output voltage for maintaining the charge on said battery when said AC power is initially applied, said charging circuit comprising a zener diode coupled to the base of a transistor having a path of controllable conductivity adapted to provide charging current to said backup battery until said backup battery exceeds the voltage of said zener diode less the difference between the base voltage and the emitter voltage of said transistor.

* * * * *